United States Patent
Chiou et al.

(10) Patent No.: US 9,521,519 B2
(45) Date of Patent: Dec. 13, 2016

(54) MOBILE COMMUNICATION DEVICES AND CONTEXT-BASED GEOFENCE CONTROL METHODS THEREOF

(71) Applicant: MediaTek Inc., Hsin-Chu (TW)

(72) Inventors: Tsung-Yu Chiou, Zhudong Township, Hsinchu County (TW); Chih-Hsiang Hsiao, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/754,067

(22) Filed: Jun. 29, 2015

(65) Prior Publication Data

US 2016/0007156 A1    Jan. 7, 2016

Related U.S. Application Data

(60) Provisional application No. 62/020,000, filed on Jul. 2, 2014.

(51) Int. Cl.
*H04W 24/00* (2009.01)
*H04W 4/02* (2009.01)
*H04W 52/02* (2009.01)

(52) U.S. Cl.
CPC ............. *H04W 4/022* (2013.01); *H04W 4/023* (2013.01); *H04W 52/0209* (2013.01); *Y02B 60/50* (2013.01)

(58) Field of Classification Search
CPC .... H04W 4/02; H04W 8/245; H04M 1/72519; G06Q 10/08
USPC ........................ 455/456.3, 550.1, 419; 705/32
See application file for complete search history.

(56) References Cited

U.S. PATENT DOCUMENTS

| | | | |
|---|---|---|---|
| 8,620,393 B2 | 12/2013 | Bornstein et al. | |
| 8,810,454 B2 | 8/2014 | Cosman | |
| 2007/0146129 A1 | 6/2007 | Sun | |
| 2010/0099377 A1* | 4/2010 | Jeong ................... | H04B 1/3805 455/404.2 |
| 2010/0100507 A1* | 4/2010 | Davidson ............... | G06Q 10/04 705/412 |
| 2011/0238300 A1* | 9/2011 | Schenken ............. | B60W 40/09 701/408 |
| 2012/0161958 A1 | 6/2012 | Turon et al. | |
| 2012/0172027 A1* | 7/2012 | Partheesh ............. | H04W 4/021 455/420 |
| 2012/0246039 A1* | 9/2012 | Fain ....................... | G06Q 10/08 705/32 |
| 2013/0085861 A1 | 4/2013 | Dunlap | |

(Continued)

FOREIGN PATENT DOCUMENTS

| | | |
|---|---|---|
| CN | 102027792 | 4/2011 |
| CN | 102938927 | 2/2013 |

(Continued)

*Primary Examiner* — Danh Le
(74) *Attorney, Agent, or Firm* — McClure, Qualey & Rodack, LLP

(57) ABSTRACT

A mobile communication device including a positioning unit and a processing unit is provided. The processing unit provides position information of the mobile communication device. The processing unit detects an approach to a first geofence according to one or more contexts associated with the mobile communication device, turns off the positioning unit when not detecting the approach to the first geofence, and turns on the positioning unit when detecting the approach to the first geofence.

18 Claims, 6 Drawing Sheets

(56) References Cited

U.S. PATENT DOCUMENTS

2014/0279707 A1* 9/2014 Joshua ............... G06Q 30/0283
705/400

FOREIGN PATENT DOCUMENTS

| CN | 103380446 | 10/2013 |
| CN | 103842845 | 6/2014 |

* cited by examiner

MOBILE COMMUNICATION DEVICES AND CONTEXT-BASED GEOFENCE CONTROL METHODS THEREOF

CROSS REFERENCE TO RELATED APPLICATIONS

This application claims priority of U.S. Provisional Application No. 62/020,000, filed on Jul. 2, 2014, the entirety of which is incorporated by reference herein.

BACKGROUND OF THE INVENTION

Field of the Invention

The invention generally relates to location-based services using geofences, and more particularly to context-based geofence control methods for reducing power consumption.

Description of the Related Art

In recent years, Location-Based Services (LBS) involving "geofences" have dramatically increased in popularity, along with the rapid development of positioning technologies. Generally, a geofence refers to a virtual perimeter of a real-world geographic area for use with an LBS, and certain processes or actions associated with the LBS may be triggered for a tracked mobile device when the location information of the tracked mobile device strongly correlates to such an area. For example, a geofence may be defined as a radius around a Point of Interest (POI) or Region of Interest (ROI), and the tracked mobile device may evaluate whether it is inside or outside the geofence based on its current location. In most practices, it is required for the tracked mobile device to always turn on the positioning module(s) therein, so as to acquire updates of the location information in real time for supporting the geofence evaluation. However, always keeping the positioning module(s) on is very power consuming and inevitably results in short battery life. Thus, it is desirable to have a more energy-efficient method for geofence controls.

BRIEF SUMMARY OF THE INVENTION

In one aspect of the invention, a mobile communication device comprising a positioning unit and a processing unit is provided. The positioning unit is configured to provide position information of the mobile communication device. The processing unit is configured to detect an approach to a first geofence according to one or more contexts associated with the mobile communication device, turn off the positioning unit when not detecting the approach to the first geofence, and turn on the positioning unit when detecting the approach to the first geofence.

In another aspect of the invention, a context-based geofence control method, executed by a mobile communication device comprising a positioning unit for providing position information of the mobile communication device, is provided. The context-based geofence control method comprises the steps of: detecting an approach to a first geofence according to one or more contexts associated with the mobile communication device; turning off the positioning unit when not detecting the approach to the first geofence; and turning on the positioning unit when detecting the approach to the first geofence.

Other aspects and features of the invention will become apparent to those with ordinary skill in the art upon review of the following descriptions of specific embodiments of the mobile communication device and the context-based geofence method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
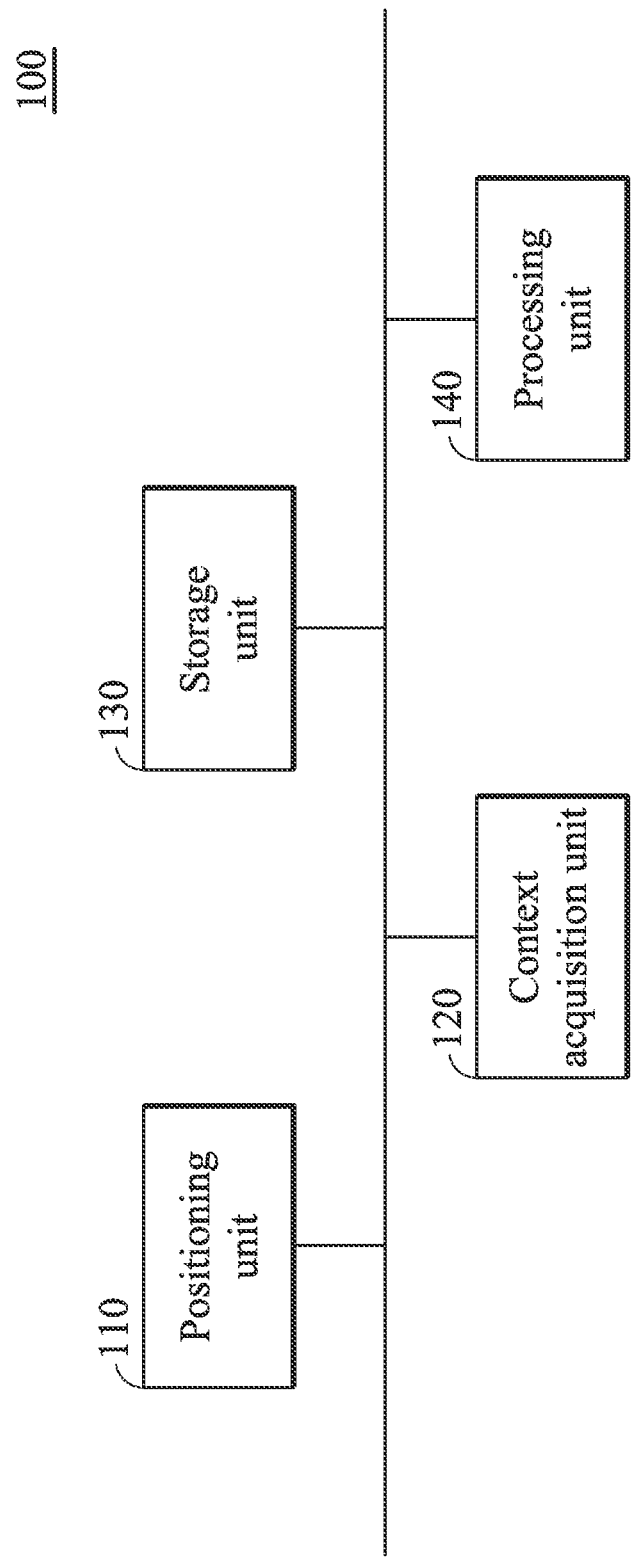
FIG. 1 is a block diagram illustrating a mobile communication device according to an embodiment of the invention.

FIG. 1 is a block diagram illustrating a mobile communication device according to an embodiment of the invention. The mobile communication device 100 comprises a positioning unit 110, a context acquisition unit 120, a storage unit 130, and a processing unit 140. The positioning unit 110 is responsible for providing position information of the mobile communication device 100. For example, the positioning unit 110 may comprise a Wireless Fidelity (WiFi) module and/or a Global Navigation Satellite System (GNSS) module. The WiFi technology utilized by the WiFi module is a Short Range Wireless (SRW) technology, by which the mobile communication device 100 may obtain wireless services, such as data and/or voice services, from an Access Point (AP), and obtain the Service Set Identification (SSID), Basic SSID (BSSID), or Extended SSID (ESSID) of the connected AP for positioning purposes. The WiFi technology generally has, on average, a coverage varying from 20 meters in an area with obstacles (walls, stairways, elevators etc) to 100 meters in an area with a clear line of sight. The GNSS technology. The GNSS may be a Global Positioning System (GPS), GLONASS, Galileo system, or Beidou system, which is capable of receiving location and time information from satellites in all weather conditions.

The context acquisition unit 120 is responsible for obtaining contexts associated with the mobile communication device 100. Specifically, the contexts provide information from which the location/position of the mobile communication device 100 may be derived. The contexts may include several types of contexts, such as cellular contexts, personal contexts, and multimedia contexts.

In one embodiment, the cellular contexts may include the identity of a cell (referred to herein as cell identity) on which the mobile communication device 100 is currently camped, and/or the identity of a Public Land Mobile Network (PLMN) (referred to herein as PLMN identity) to which the cell belongs. Correspondingly, the context acquisition unit 120 may include a cellular communication module utilizing one or more of the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology, etc.

In one embodiment, the personal contexts may include at least one of the following: 1) an operation mode of the mobile communication device 100, which indicates whether the mobile communication device 100 is operating in a flight mode or a power-saving mode; 2) an event in a calendar application (e.g., Google Calendar) executed by the mobile communication device 100; and 3) mobility information of the mobile communication device 100, which indicates the moving speed of the mobile communication device 100. Correspondingly, the context acquisition unit 120 may include a software process for retrieving the operation mode, or an application for retrieving the calendar event information, or a cellular communication module for determining the moving speed by, for example, counting the number of crossed cell edges within a given time period.

In one embodiment, the multimedia contexts may include at least one of the following: 1) an image in which at least one landmark is taken; 2) a radio broadcast in which at least one place name is announced; and 3) a video stream in which at least one landmark appears or at least one place name appears or is announced. Correspondingly, the context acquisition unit 120 may include a digital camera for obtaining the image, or a radio receiver for obtaining the radio broadcast, or a video camera for obtaining the video stream.

The storage unit 130 is responsible for storing the contexts obtained by the context acquisition unit 120. For example, the storage unit 130 may be a memory (e.g., Random Access Memory (RAM), Flash memory, or Non-Volatile Random Access Memory (NVRAM), etc.), a magnetic storage device (e.g., magnetic tape or hard disk), an optical storage device (e.g., Compact Disc Read-Only Memory (CD-ROM)), or any combination thereof.

The processing unit 140 may be a Micro Control Unit (MCU), a general-purpose processor, a Digital Signal Processor (DSP), an application processor, or the like, which is responsible for providing the function of data processing and computing, and for controlling the operation of the positioning unit 110 and the context acquisition unit 120 for performing the context-based geofence control method of the present invention. Specifically, the processing unit 140 uses the contexts to detect an approach to a geofence, and then decides to turn on the positioning unit 110 when detecting an approach to the geofence and to turn off the positioning unit 110 when not detecting an approach to the geofence.

Although not shown, the mobile communication device 100 may further comprise other functional units as needed, such as a display device (e.g., a screen, a panel, or a touch panel), an Input and Output (I/O) device (e.g., a mouse, a keyboard, a microphone, a speaker, and/or a touch pad), and so on. For example, the mobile communication device 100 may be a feature phone, a smartphone, a panel PC, a notebook computer, or a gaming console device, etc.

Figure 2:
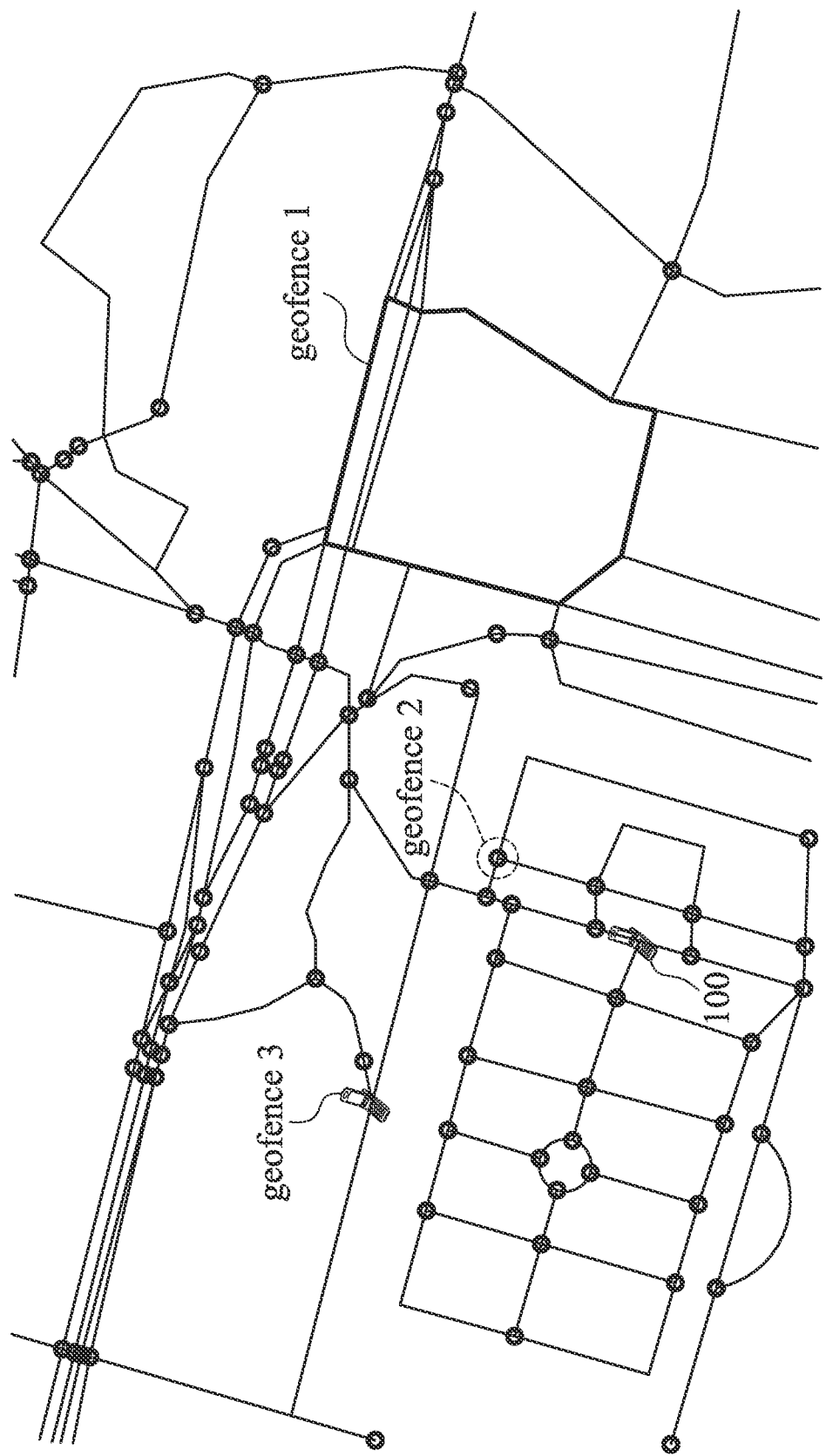
FIG. 2 is a schematic diagram of a regional map with geofences and the position of the mobile communication device 100 according to an embodiment of the invention.

FIG. 2 is a schematic diagram of a regional map with geofences and the position of the mobile communication device 100 according to an embodiment of the invention. As shown in FIG. 2, a geofence may be a spot, e.g., the denoted geofence 2, or an area, e.g., the denoted geofence 1, or a position of another mobile communication device, e.g., the denoted geofence 3. The denoted geofence 1 and geofence 2 may be predetermined or dynamically determined. For example, the denoted geofence 1 may be predetermined to a Point of Interest (POI), such as a favorite restaurant, coffee shop, or store, or may be dynamically determined to be the site of a traffic accident, or the site of a limited time offer. The denoted geofence 2 may be predetermined to be a Region of Interest (ROI), such as a house, a supermarket, an exhibition center, an office, or a park, or may be dynamically determined to be an area that is temporarily cordoned off by police for emergency or sudden incidents. For the case where the denoted geofence 1 or geofence 2 is dynamically determined, certain feeds for configuring the geofences may be required to be installed on the mobile communication device 100. When the mobile communication device 100 approaches the denoted geofence 1 or geofence 2 within a predetermined distance (e.g., 100 meters), or enters or leaves the denoted geofence 1 or geofence 2, a task may be performed by the mobile communication device 100, wherein the task may involve sending an email, text message, or application notification (e.g., a Facebook message) to a third party.

The denoted geofence 3 may also be referred to as a Peer-to-Peer (P2P) geofence. When the two tracked mobile communication devices are approaching or moving away from each other within a predetermined distance, a task may be performed by either one or both of the mobile communication devices, wherein the task may involve generating an alarm or notification indicating to the user that they are approaching or moving away from each other.

Figure 3:
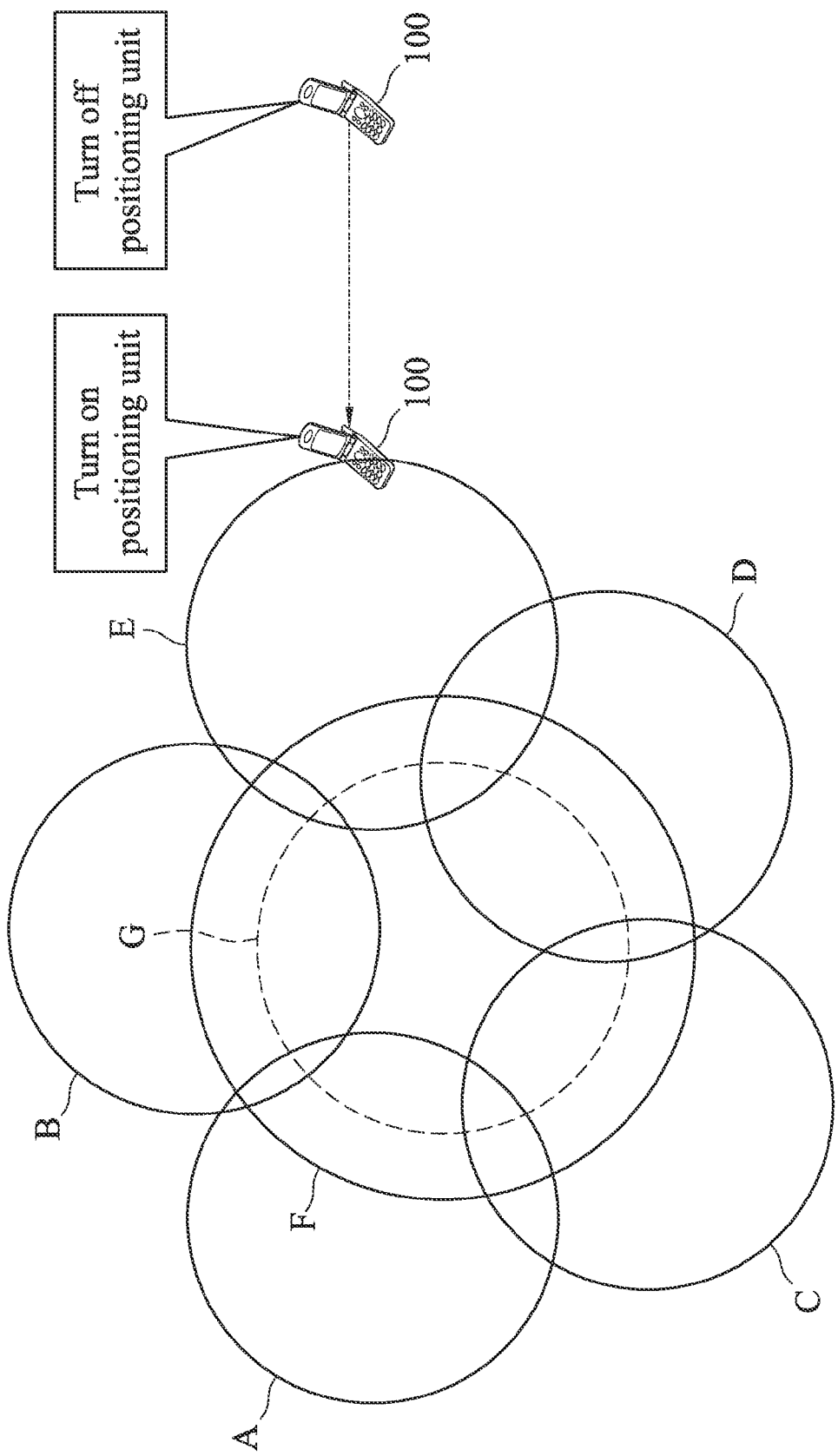
FIG. 3 is a schematic diagram illustrating an exemplary layout with coverage of a geofence and multiple cells according to an embodiment of the invention.

FIG. 3 is a schematic diagram illustrating an exemplary layout with coverage of a geofence and multiple cells according to an embodiment of the invention. In this embodiment, the contexts used for detecting an approach to the geofence are the cell identities of the cells around the geofence. As shown in FIG. 3, there are 6 cells with cell identities A to F, and 1 geofence (denoted as "G"), wherein the coverage of each cell and the geofence overlaps at least in part with each other. Each of the cells is formed by a respective cellular station, such as a Base Station (BS), a Node-B (NB), or an evolved NB (eNB), of a service network, which uses the cellular technology (e.g., GSM/GPRS/EDGE technology, WCDMA technology, CDMA-2000 technology, TD-SCDMA technology, WiMAX technology, or LTE/TD-LTE/LTE-A technology) to provide wireless services for the mobile communication device 100.

In this embodiment, it is assumed that the mobile communication device 100 has been to the geofence before and has stored the cell identities of the cells around the geofence. When none of the cell identities A to F is detected, the mobile communication device 100 turns off the positioning unit 110 to save power due to the fact that it doesn't come close to the geofence. In one embodiment, the mobile communication device 100 may detect a cell identity of a cell after it has successfully camped on the cell. Later, when one of the cell identities A to F is detected, the mobile communication device 100 turns on the positioning unit 110 to obtain precise location information of the mobile communication device 100 due to the fact that it has come close to the geofence.

It is noted that, in this embodiment, the geofence is covered by the cell with cell identity F. After the mobile communication device 100 enters the geofence, it keeps the positioning unit 110 on when not detecting the cell identity F, and turns off the positioning unit 110 when detecting the cell identity F due to the fact that it is far from the edge of the geofence.

Figure 4:
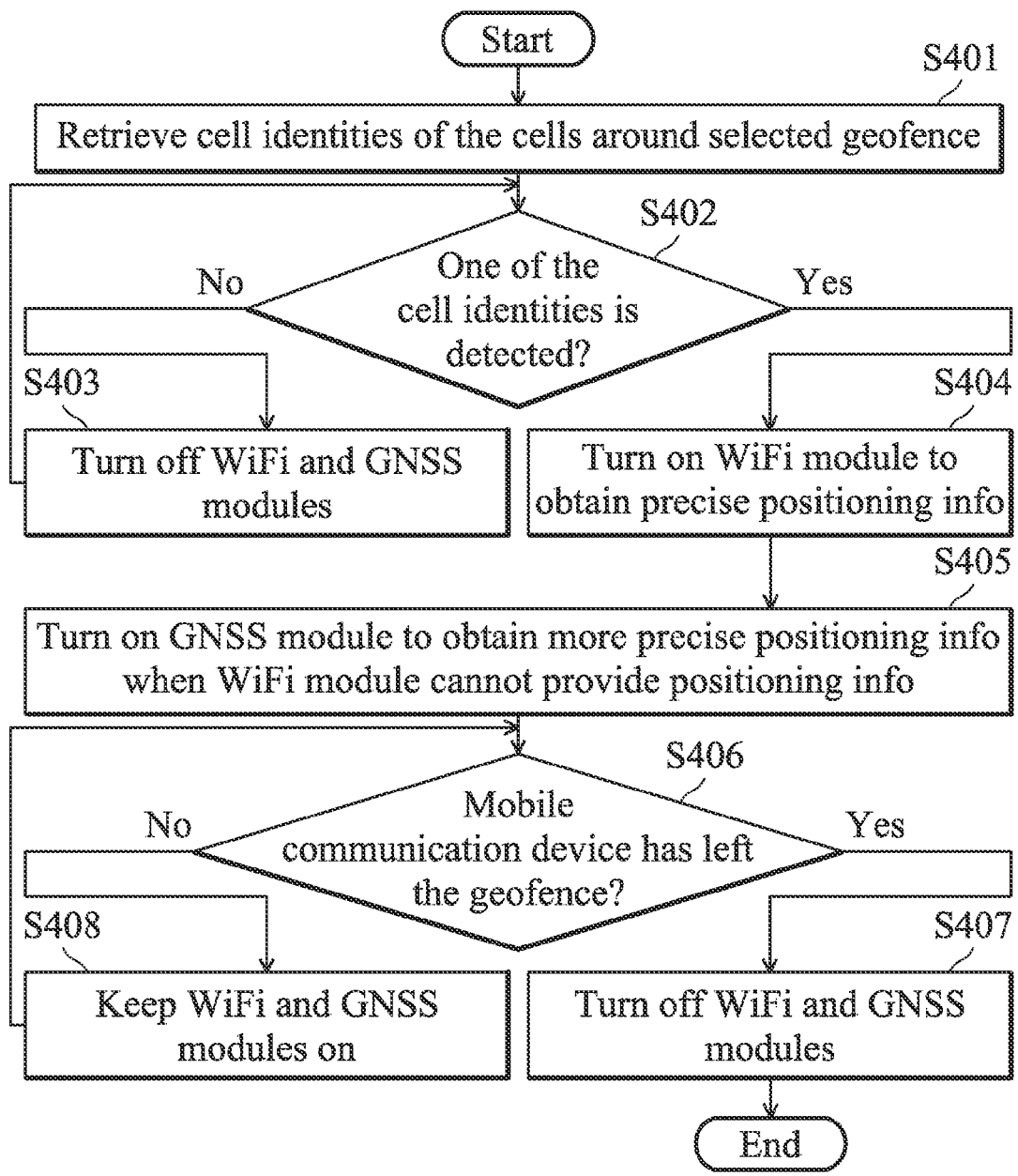
FIG. 4 is a flow chart illustrating the context-based geofence control method according to an embodiment of the invention.

FIG. 4 is a flow chart illustrating the context-based geofence control method according to an embodiment of the invention. In this embodiment, the context-based geofence control method is applied to a mobile communication device comprising a WiFi module and a GNSS module for providing position information of the mobile communication device, and the contexts used for detecting an approach to the geofence are the cell identities of the cells around the geofence. To begin, the mobile communication device retrieves the cell identities of the cells around the selected geofence (step S401). Next, the mobile communication device detects an approach to the selected geofence according to the cell identities. Specifically, the mobile communication device determines whether one of the cell identities is detected (step S402). If none of the cell identities is detected, the mobile communication device turns off the WiFi module and the GNSS module to save power (step S403), and the method returns to step S402.

Subsequent to step S402, if one of the cell identities is detected, the mobile communication device turns on the WiFi module to obtain precise positioning information of the mobile communication device (step S404), and then turns on the GNSS module to obtain more precise positioning information of the mobile communication device when the WiFi module cannot provide positioning information of the mobile communication device (step S405). In another embodiment, if one of the cell identities is detected, the mobile communication device may wait for a predetermined period of time before continuing with step S404. Later, after the mobile communication device enters the geofence, it is determined whether it has left the geofence (step S406), and if so, it turns off the WiFi module and the GNSS module (step S407), and the method ends. Otherwise, if the mobile communication device is still in the geofence, it keeps the WiFi module and the GNSS module on (step S408), and the method returns to step S406.

Figure 5:
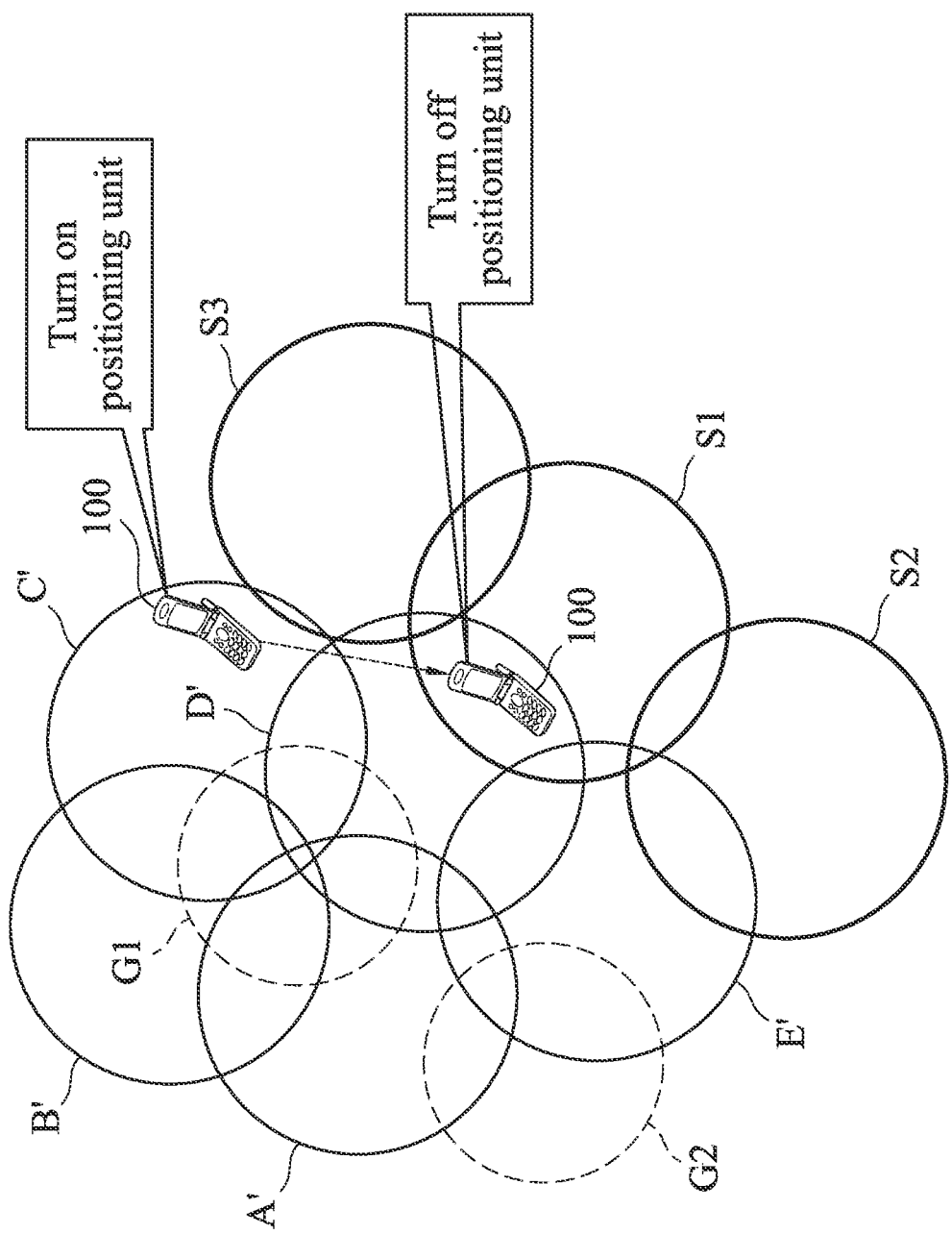
FIG. 5 is a schematic diagram illustrating an exemplary layout with coverage of a geofence and multiple cells according to another embodiment of the invention.

FIG. 5 is a schematic diagram illustrating an exemplary layout with coverage of a geofence and multiple cells according to another embodiment of the invention. In this embodiment, the contexts used for detecting an approach to the geofences are the cell identities of the cells around the geofences. As shown in FIG. 5, there are 5 cells with cell identities A' to E', and 2 geofences (denoted as "G1" and "G2"), wherein the coverage of each cell and the geofence G1 or G2 overlaps at least in part with each other. Each of the cells is formed by a respective cellular station, such as a BS, an NB, or an eNB, of a service network, which uses the cellular technology to provide wireless services for the mobile communication device 100. In addition to the cells and the geofences, there are 3 special geofences, called safe zones (denoted as "S1", "S2", and "S3"), each of which specifies an area where the mobile communication device 100 may turn off the positioning unit 110 when it is in such an area. For example, the safe zones S1, S2, and S3 may be offices where the user of the mobile communication device 100 goes to work, and the geofences G1 and G2 may refer to favorite restaurants near the offices, wherein each of the save zones S1, S2, and S3 may be defined by the coverage of a respective cell other than the cells with cell identities A' to E'.

In this embodiment, it is assumed that the mobile communication device 100 has been to the geofences before and has stored the cell identities of the cells around the geofences. When one of the cell identities A' to E' is detected, the mobile communication device 100 turns on the positioning unit 110 to obtain precise location information of the mobile communication device 100 due to the fact that it has come close to the geofence G1. In one embodiment, the mobile communication device 100 may detect a cell identity of a cell after it has successfully camped on the cell. Later, when the mobile communication device 100 enters the safe zone S1, it turns off the positioning unit 110 to save power regardless of the fact that the geofences G1 and G2 are nearby.

Figure 6:
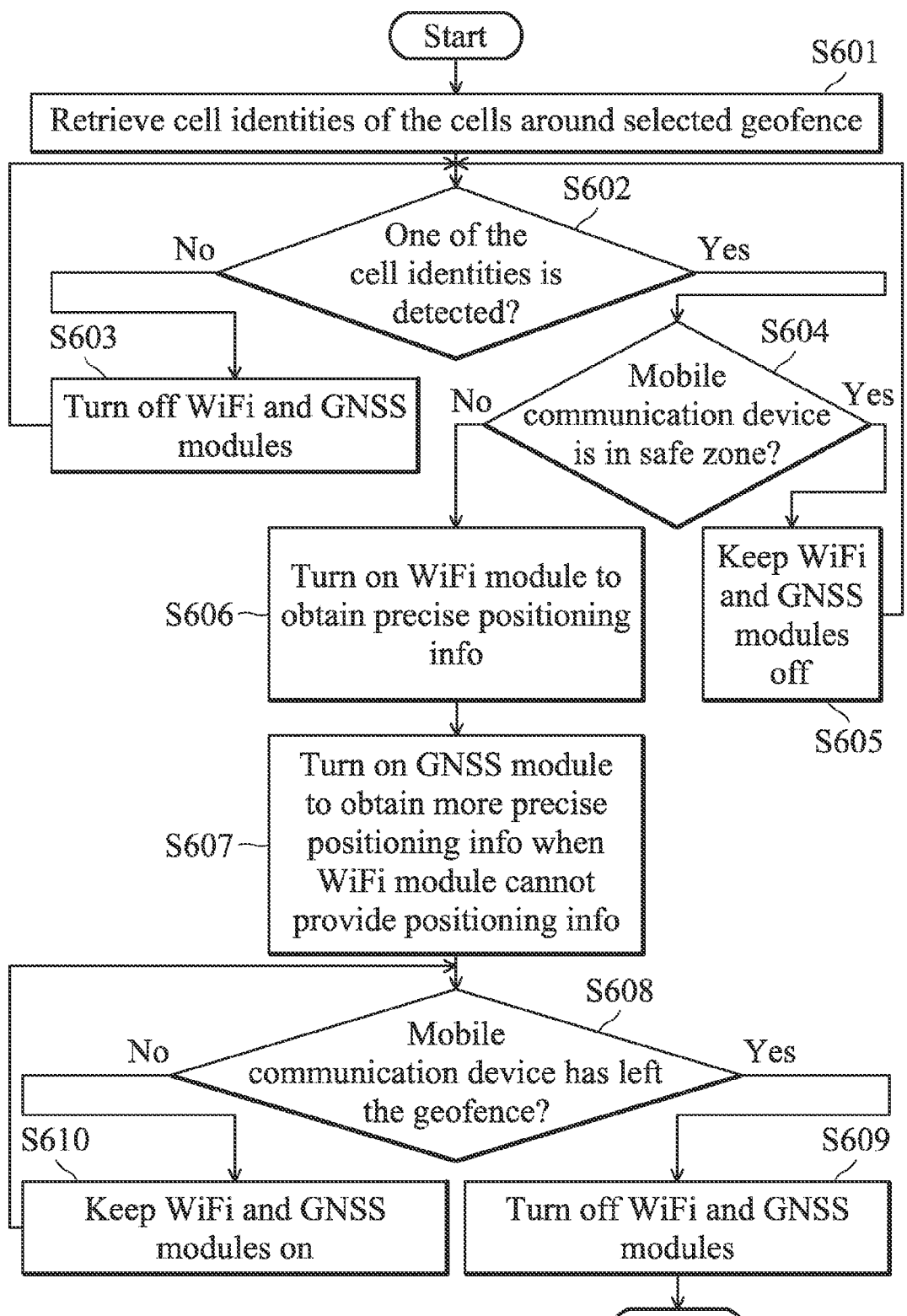
FIG. 6 is a flow chart illustrating the context-based geofence control method according to another embodiment of the invention.

FIG. 6 is a flow chart illustrating the context-based geofence control method according to another embodiment of the invention. Similar to FIG. 4, the context-based geofence control method is applied to a mobile communication device comprising a WiFi module and a GNSS module for providing position information of the mobile communication device, and the contexts used for detecting an approach to the geofence are the cell identities of the cells around the geofence. To begin, the mobile communication device retrieves the cell identities of the cells around the selected geofences (step S601). Next, the mobile communication device detects an approach to any one of the selected geofences according to the cell identities. Specifically, the mobile communication device determines whether one of the cell identities is detected (step S602). If none of the cell identities is detected, the mobile communication device turns off the WiFi module and the GNSS module to save power (step S603), and the method returns to step S602.

Subsequent to step S602, if one of the cell identities is detected, the mobile communication device determines whether it is in a safe zone (step S604). If the mobile communication device is in a safe zone, it keeps the WiFi module and the GNSS module off to save power (step S605), and the method returns to step S602. Otherwise, if the mobile communication device is not in a safe zone, it turns on the WiFi module to obtain precise positioning information of the mobile communication device (step S606), and then turns on the GNSS module to obtain more precise positioning information of the mobile communication device when the WiFi module cannot provide the positioning information of the mobile communication device (step S607).

Later, after the mobile communication device enters one of the geofences, it is determined whether it has left the geofence (step S608), and if so, it turns off the WiFi module and the GNSS module (step S609), and the method ends. Otherwise, if the mobile communication device is still in the geofence, it keeps the WiFi module and the GNSS module on (step S610), and the method returns to step S608.

It should be understood that, although the aforementioned embodiments use cell identities as the contexts for detecting an approach to geofences, other types of contexts may be used instead. For example, if the contexts are the PLMN identities, the mobile communication device may determine that it has approached to the geofence in a specific country when it roams to that country and detects the PLMN identity indicating the country code of that country.

If the contexts are the operation modes of the mobile communication device, the mobile communication device may determine that it has approached to the geofence when the operation mode is a flight mode or a power-saving mode. That is, the mobile communication device turns off the positioning unit when the operation mode is the flight mode or power-saving mode. If the contexts are the events in a calendar application executed by the mobile communication device, the mobile communication device may determine that it has approached to a geofence when one of the events indicates that the user should be present near the geofence by an address or a place name. If the contexts are the mobility information (e.g., moving speed) of the mobile communication device, the mobile communication device may determine that it has approached to a geofence by the distance to the geofence and its moving speed. For example, if the user of the mobile communication device is moving in 5 kilometers per hour, the mobile communication device may come close to a geofence locating 10 kilometers away from its current location in about 2 hours, and the positioning unit may be turned on 2 hours from now.

If the contexts are the images taken by the mobile communication device (with a digital camera), the mobile communication device may determine that it has approached to a geofence when a landmark near the geofence appears in the images. If the contexts are the radio broadcasts received by the mobile communication device (with a radio receiver), the mobile communication device may determine that it has approached to a geofence when the place name of the geofence or a place name near the geofence is announced in the radio broadcasts and recognized therefrom. If the contexts are the video streams recorded by the mobile communication device (with a video camera), the mobile communication device may determine that it has approached to a geofence when a landmark near the geofence appears in the video streams, or when the place name of the geofence or a place name near the geofence is announced in the video streams.

Alternatively, the mobile communication device may use any combination of different types of contexts, and may even prioritize one type of the contexts over the other types of the contexts. For example, a combination of the cell identities, calendar events, and radio broadcasts is used, wherein the cell identities are used as the main references while the calendar events and radio broadcasts are used as auxiliary references, for detecting an approach to a geofence.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
   a positioning unit, configured to provide position information of the mobile communication device; and
   a processing unit, configured to detect an approach to a first geofence according to at least one contexts associated with the mobile communication device, turn off the positioning unit when not detecting the approach to the first geofence, and turn on the positioning unit when detecting the approach to the first geofence,
   wherein the contexts comprise at least one cellular context, at least one personal context, and at least one multimedia context, and the processing unit is further configured to prioritize at least one of the cellular contexts, the personal contexts, and the multimedia contexts over the other contexts, for detecting the approach to the first geofence.

2. The mobile communication device of claim 1, wherein the processing unit is further configured to turn off the positioning unit when detecting that the mobile communication device has entered a second geofence according to one or more of the contexts.

3. The mobile communication device of claim 1, wherein the first geofence is associated with a predetermined spot or area, and the processing unit is further configured to perform a task when determining, via the positioning unit, that the mobile communication device has entered or left the first geofence, or approached the first geofence within a predetermined distance.

4. The mobile communication device of claim 1, wherein the first geofence is associated with a dynamically determined spot or area, and the processing unit is further configured to perform a task when determining, via the positioning unit, that the mobile communication device has approached the first geofence within a predetermined distance.

5. The mobile communication device of claim 1, wherein the cellular contexts comprise at least one of the following:
   an identity of a cell which the mobile communication device is currently camped on; and
   an identity of a Public Land Mobile Network (PLMN) to which the cell belongs.

6. The mobile communication device of claim 1, wherein the personal contexts comprise at least one of the following:
   an operation mode of the mobile communication device, which indicates whether the mobile communication device is operating in a flight mode or a power-saving mode;
   an event in a calendar application executed by the mobile communication device; and
   mobility information of the mobile communication device, which indicates a moving speed of the mobile communication device.

7. The mobile communication device of claim 1, wherein the multimedia contexts comprise at least one of the following:
   an image in which at least one landmark is taken;
   a radio broadcast in which at least one place name is announced; and
   a video stream in which at least one landmark appears or at least one place name appears or is announced.

8. The mobile communication device of claim 1, wherein the positioning unit comprises at least one of a Wireless Fidelity (WiFi) module and a Global Navigation Satellite System (GNSS) module.

9. A mobile communication device, comprising:
   a positioning unit, configured to provide position information of the mobile communication device; and
   a processing unit, configured to detect an approach to a first geofence according to at least one contexts associated with the mobile communication device, turn off the positioning unit when not detecting the approach to the first geofence, and turn on the positioning unit when detecting the approach to the first geofence, wherein the first geofence is associated with a position of another mobile communication device, and the processing unit is further configured to perform a task when determining, via the positioning unit, that the two mobile communication devices are approaching or moving away from each other within a predetermined distance.

10. A context-based geofence control method, executed by a mobile communication device comprising a positioning unit for providing position information of the mobile communication device, the context-based geofence control method comprising:

detecting an approach to a first geofence according to at least one contexts associated with the mobile communication device;

turning off the positioning unit when not detecting the approach to the first geofence;

turning on the positioning unit when detecting the approach to the first geofence;

wherein the contexts comprise at least one cellular context, at least one personal context, and at least one multimedia context, and the processing unit is further configured to prioritize at least one of the cellular contexts, the personal contexts, and the multimedia contexts over the other contexts, for detecting the approach to the first geofence.

11. The context-based geofence control method of claim 10, further comprising:

turning off the positioning unit when detecting that the mobile communication device has entered a second geofence according to one or more of the contexts.

12. The context-based geofence control method of claim 10, wherein the first geofence is associated with a predetermined spot or area, and the context-based geofence control method further comprises:

performing a task when determining, via the positioning unit, that the mobile communication device has entered or left the first geofence, or approached the first geofence within a predetermined distance.

13. The context-based geofence control method of claim 10, wherein the first geofence is associated with a dynamically determined spot or area, and the context-based geofence control method further comprises:

performing a task when determining, via the positioning unit, that the mobile communication device has approached the first geofence within a predetermined distance.

14. The context-based geofence control method of claim 10, wherein the first geofence is associated with a position of another mobile communication device, and the context-based geofence control method further comprises:

performing a task when determining, via the positioning unit, that the two mobile communication devices are approaching or moving away from each other within a predetermined distance.

15. The context-based geofence control method of claim 10, wherein the cellular contexts comprise at least one of the following:

an identity of a cell which the mobile communication device is currently camped on; and an identity of a Public Land Mobile Network (PLMN) to which the cell belongs.

16. The context-based geofence control method of claim 10, wherein the personal contexts comprise at least one of the following:

an operation mode of the mobile communication device, which indicates whether the mobile communication device is operating in a flight mode or a power-saving mode;

an event of a calendar application executed by the mobile communication device; and mobility information of the mobile communication device, which indicates a moving speed of the mobile communication device.

17. The context-based geofence control method of claim 10, wherein the multimedia contexts comprise at least one of the following:

an image in which at least one landmark is taken;

a radio broadcast in which at least one place name is announced; and a video stream in which at least one landmark appears or at least one place name appears or is announced.

18. The context-based geofence control method of claim 10, wherein the positioning unit comprises at least one of a Wireless Fidelity (WiFi) module and a Global Navigation Satellite System (GNSS) module.

* * * * *